US012441589B2

(12) United States Patent
Takaki et al.

(10) Patent No.: US 12,441,589 B2
(45) Date of Patent: Oct. 14, 2025

(54) STEEL PLATE LIFTING METHOD WITH USE OF LIFTING MAGNET, LIFTING MAGNET, AND METHOD FOR MANUFACTURING STEEL PLATE BY USING LIFTING MAGNET

(71) Applicant: JFE STEEL CORPORATION, Tokyo (JP)

(72) Inventors: Yuki Takaki, Tokyo (JP); Yusaku Takemura, Tokyo (JP); Atsushi Kurimoto, Tokyo (JP); Ayaka Kawai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 260 days.

(21) Appl. No.: 18/275,553

(22) PCT Filed: Dec. 15, 2021

(86) PCT No.: PCT/JP2021/046215
§ 371 (c)(1),
(2) Date: Aug. 2, 2023

(87) PCT Pub. No.: WO2022/180993
PCT Pub. Date: Sep. 1, 2022

(65) Prior Publication Data
US 2024/0101396 A1 Mar. 28, 2024

(30) Foreign Application Priority Data
Feb. 26, 2021 (JP) ................................ 2021-031240

(51) Int. Cl.
*B66C 1/08* (2006.01)

(52) U.S. Cl.
CPC ..................................... *B66C 1/08* (2013.01)

(58) Field of Classification Search
CPC .............. B66C 1/08; H01F 7/06; H01F 7/206
(Continued)

(56) References Cited

U.S. PATENT DOCUMENTS

2020/0385240 A1* 12/2020 Takaki ...................... B66C 1/04

FOREIGN PATENT DOCUMENTS

JP S5225361 A * 2/1977
JP S52-66258 A 6/1977
(Continued)

OTHER PUBLICATIONS

Machine translation of Choi Korean Patent Document KR 10-2012-0073164 Jul. 2012 (Year: 2012).*
(Continued)

*Primary Examiner* — Kevin J Comber
(74) *Attorney, Agent, or Firm* — Oliff PLC

(57) ABSTRACT

A method for using a lifting magnet and a lifting magnet. The lifting magnet includes a plurality of electromagnet coils that are each independently ON/OFF-controllable and voltage-controllable, and a magnetic pole that is excited by application of a voltage to the electromagnet coils. An electromagnet coil to be used for lifting steel plates is determined based on a total thickness of the steel plates to be lifted. An amount of passing magnetic flux $\Phi_r$ in the magnetic pole in a case where magnetic flux passes through only the steel plates to be lifted when the electromagnet coil is used is calculated. An application voltage to be applied to the electromagnet coil used for lifting the steel plates is determined based on the amount of passing magnetic flux $\Phi_r$. The application voltage is applied to the electromagnet coil.

10 Claims, 12 Drawing Sheets

(58) Field of Classification Search
USPC .......................................................... 361/144
See application file for complete search history.

(56) References Cited

FOREIGN PATENT DOCUMENTS

| | | | | | |
|---|---|---|---|---|---|
| JP | S52-118756 | A | | 10/1977 | |
| JP | S55-44445 | A | | 3/1980 | |
| JP | S6362479 | U | * | 4/1988 | |
| JP | H02-295889 | A | | 12/1990 | |
| KR | 10-2012-0073164 | A | | 7/2012 | |
| KR | 20120073164 | A | * | 7/2012 | ............... B66C 1/08 |
| WO | 2019/107504 | A1 | | 6/2019 | |

OTHER PUBLICATIONS

Machine translation of Morio Japanese Patent Document JP S52-25361 A Feb. 1977 (Year: 1977).*
Machine translation of Japanese Patent Document JP S63-62479 U Apr. 1988 (Year: 1988).*
Dec. 6, 2022 Office Action issued in Japanese Patent Application No. 2022-516105.
Apr. 4, 2023 Office Action issued in Japanese Patent Application No. 2022-516105.
Apr. 19, 2024 Office Action issued in European Patent Application No. 21928086.4.
Feb. 15, 2022 International Search Report issued in International Patent Application No. PCT/JP2021/046215.

* cited by examiner

NUMBER OF STEEL PLATES TO BE LIFTED: n[−]
THICKNESS OF STEEL PLATE: $t_1, t_2, \cdots, t_n$ [mm]
SATURATION MAGNETIC FLUX DENSITY OF STEEL PLATE: $Bs_1, Bs_2, \cdots, Bs_n$ [T]
MAGNETIC POLE OUTER DIAMETER: $R_1, R_2, \cdots, R_m$ [mm]

STEEL PLATE LIFTING METHOD WITH USE OF LIFTING MAGNET, LIFTING MAGNET, AND METHOD FOR MANUFACTURING STEEL PLATE BY USING LIFTING MAGNET

TECHNICAL FIELD

This application relates to a steel plate lifting method for suspending and transporting steel plates with a lifting magnet in, for example, a steelworks, a steel material processing plant, or the like, a lifting magnet suitable for implementing the steel plate lifting method, and a method for manufacturing a steel plate by using the lifting magnet.

BACKGROUND

A plate mill in a steelworks generally includes a rolling facility (rolling step) for rolling a massive steel material to a desired thickness, a finishing facility (finishing step) for performing finishing operations such as cutting into a shipping size, deburring edges, repairing surface flaws, and inspecting internal flaws, and a product warehouse for storing steel plates (thick plates) awaiting shipment.

Steel plates in-process in the finishing step and steel plates awaiting shipment in the product warehouse are stored in such a manner that several to ten-odd steel plates are stacked on top of each other due to limited space for placement. For rearrangement or shipment of steel plates, an operation of lifting and moving a target steel plate (one to several steel plates) is performed by using an electromagnetic lifting magnet attached to a crane.

An internal structure of a typical electromagnetic lifting magnet is illustrated in FIG. 16 (vertical cross-sectional view). The lifting magnet includes therein a coil 100 having a diameter of one hundred to several hundred millimeters. An inner pole 101 (inner pole iron core) is arranged inside the coil 100, and an outer pole 102 (outer pole iron core) is arranged outside the coil 100. A yoke 103 is secured in contact with an upper end of the inner pole 101 and an upper end of the outer pole 102. In this lifting magnet, the inner pole 101 and the outer pole 102 are brought into contact with a steel plate, with the coil 100 energized, thereby forming a magnetic field circuit. As a result, the steel plate is attracted to the lifting magnet. In the lifting magnet, which is used in a steelworks, a single large coil 100 generates magnetic flux to secure a sufficient lifting force. The lifting magnet is typically designed such that the density of the magnetic flux passing through the inner pole 101 is equal to or greater than 1 T (=10000 G).

To control the number of steel plates to be attracted to the lifting magnet, the penetration depth reached by the magnetic flux (magnetic flux penetration depth) needs to be controlled in accordance with the thickness of the steel plates and the number of steel plates to be lifted. In the conventionally used lifting magnet, however, the magnetic flux penetration depth is difficult to control with high accuracy. For this reason, when a predetermined number of steel plates are to be lifted, it is operationally difficult to attract only the predetermined number of steel plates from the beginning. Accordingly, the number of steel plates to be attracted is adjusted by a procedure in which an excess number of steel plates are attracted once and then the excess attracted steel plates are dropped by adjusting the current of the lifting magnet or by turning on and off the lifting magnet. However, such a method results in many repetitions of the adjustment, depending on the skill of the operator operating the crane, leading to a significant reduction in work efficiency. In addition, such an operation of adjusting the number of steel plates to be attracted is a large obstacle to automation of the crane.

Techniques have been introduced to address the problems described above. One proposed technique to enable automatic control of the number of steel plates to be lifted is a method of controlling a current to be applied to a coil of a lifting magnet to control a lifting force (Patent Literature 1).

CITATION LIST

Patent Literature

PTL 1: Japanese Unexamined Patent Application Publication No. 2-295889

SUMMARY

Technical Problem

In the method of Patent Literature 1, the current of the coil is controlled to control the amount of output magnetic flux, thereby changing the penetration depth of the magnetic flux. However, a lifting magnet, which is generally used in a plate mill in a steelworks, requires lifting a steel plate having a large thickness equal to or greater than a thickness of 100 mm. Thus, the lifting magnet is designed to be capable of applying a large amount of magnetic flux to the steel plate from a large magnetic pole, and has a large maximum magnetic flux penetration depth. Thus, a slight change in current can greatly change the magnetic flux penetration depth, causing a problem of poor controllability in controlling the number of thin steel plates to be lifted. To address this problem, a method is conceived for improving lifting controllability by reducing the size of the coil itself and reducing the magnetic flux penetration depth at maximum current. In steelworks, it is necessary to also lift a steel plate having a large thickness. With this method, there is a risk that an attraction force required for lifting a steel plate having a large thickness will not be obtained or that the steel plate will fall due to a reason such as a gap caused by the deflection of the steel plate.

Accordingly, to address the problems of the related art described above, an object of the disclosed embodiments is to provide a method for lifting steel plates with a lifting magnet by controlling the magnetic flux penetration depth with high accuracy in accordance with the thickness of the steel plates and the number of steel plates to be lifted, thereby providing reliable and stable lifting of a desired number of steel plates regardless of the thickness of the steel plates.

Another object of the disclosed embodiments is to provide a lifting magnet suitable for implementing the lifting method described above.

Solution to Problem

The disclosed embodiments for addressing the problems described above are summarized as follows.

[1] A steel plate lifting method with use of a lifting magnet, for lifting only at least one steel plate to be lifted from among a plurality of stacked steel plates by using the lifting magnet includes using the lifting magnet, the lifting magnet including a plurality of electromagnet coils that are each independently ON/OFF-controllable and voltage-controllable, and a magnetic pole that is excited by application of a voltage to the electromagnet coils; determining, based on a total thickness of the at least one steel plate to be lifted, an electromagnet coil to be used for lifting the at least one steel plate; calculating an amount of passing magnetic flux $\Phi_r$ in the magnetic pole in a case where magnetic flux flowing out of the magnetic pole passes through only the at least one steel plate to be lifted when the electromagnet coil is used; determining an application voltage to be applied to the electromagnet coil used for lifting the at least one steel plate, based on the amount of passing magnetic flux $\Phi_r$; and applying the application voltage to the electromagnet coil to lift only the at least one steel plate to be lifted from among the plurality of stacked steel plates.

[2] In the steel plate lifting method with use of a lifting magnet according to [1] above, the lifting magnet further includes a magnetic flux sensor that measures an amount of passing magnetic flux in the magnetic pole. The steel plate lifting method further includes, when applying the application voltage to the electromagnetic coil, adjusting the application voltage for the electromagnet coil such that a difference between the calculated amount of passing magnetic flux $\Phi_r$ in the magnetic pole and an amount of passing magnetic flux $\Phi_a$ in the magnetic pole is equal to or less than a threshold, the amount of passing magnetic flux $\Phi_a$ in the magnetic pole being measured by the magnetic flux sensor.

[3] In the steel plate lifting method with use of a lifting magnet according to [1] or [2] above, the amount of passing magnetic flux $\Phi_r$ in the magnetic pole is calculated based on a thickness and a saturation magnetic flux density of each of the at least one steel plate to be lifted and a size of the magnetic pole excited by application of the application voltage to the electromagnet coil.

[4] The steel plate lifting method with use of a lifting magnet according to any one of [1] to [3] above further includes, after starting lifting of the at least one steel plate with the lifting magnet, performing (I) and/or (II) below before moving the lifting magnet with which the at least one steel plate is lifted:

(I) increasing the application voltage for the electromagnet coil being used for lifting the at least one steel plate; and (II) applying a voltage to one or more other electromagnet coils in addition to the electromagnet coil being used for lifting the at least one steel plate.

[5] In the steel plate lifting method with use of a lifting magnet according to any one of [1] to [4] above, the lifting magnet includes a plurality of electromagnet coils that are arranged concentrically or/and arranged vertically in layers.

[6] A lifting magnet includes a plurality of electromagnet coils that are each independently ON/OFF-controllable and voltage-controllable; a magnetic pole that is excited by application of a voltage to the electromagnet coils; and a control device configured to determine, when only at least one steel plate to be lifted is to be lifted from among a plurality of stacked steel plates, an electromagnet coil to be used for lifting the at least one steel plate, based on a total thickness of the at least one steel plate to be lifted, calculate an amount of passing magnetic flux $\Phi_r$ in the magnetic pole in a case where magnetic flux flowing out of the magnetic pole passes through only the at least one steel plate to be lifted when the electromagnet coil is used, determine an application voltage to be applied to the electromagnet coil used for lifting the at least one steel plate, based on the amount of passing magnetic flux $\Phi_r$, and apply the application voltage to the electromagnet coil.

[7] The lifting magnet according to [6] above further includes a magnetic flux sensor that measures an amount of passing magnetic flux in the magnetic pole. The control device is configured to, when applying the application voltage to the electromagnet coil, adjust the application voltage for the electromagnet coil such that a difference between the calculated amount of passing magnetic flux $\Phi_r$ in the magnetic pole and an amount of passing magnetic flux $\Phi_a$ in the magnetic pole is equal to or less than a threshold, the amount of passing magnetic flux $\Phi_a$ in the magnetic pole being measured by the magnetic flux sensor.

[8] In the lifting magnet according to [6] or [7] above, the control device is configured to calculate the amount of passing magnetic flux $\Phi_r$ in the magnetic pole, based on a thickness and a saturation magnetic flux density of each of the at least one steel plate to be lifted and a size of the magnetic pole excited by application of the application voltage to the electromagnet coil to be used.

[9] The lifting magnet according to any one of [6] to [8] above includes a plurality of electromagnet coils that are arranged concentrically or/and arranged vertically in layers.

A method for manufacturing a steel plate by using the lifting magnet according to any one of [6] to [9] above.

Advantageous Effects

According to the disclosed embodiments, when steel plates are to be lifted with a lifting magnet, a lifting magnet including a plurality of electromagnet coils that are each independently ON/OFF-controllable and voltage-controllable, is used. At least one or all of the electromagnet coils of the lifting magnet are selectively used in accordance with the total thickness of the steel plates to be lifted. Further, a voltage is applied to the selected electromagnet coil(s) so that the amount of passing magnetic flux in a magnetic pole has an optimum value for lifting the steel plates to be lifted. This allows the magnetic flux penetration depth to be controlled with high accuracy from a small value on the order of several millimeters to a large value equal to or greater than 100 mm in accordance with the thickness of the steel plates and the number of steel plates to be lifted, providing reliable and stable lifting of a desired number of steel plates regardless of the thickness of the steel plates. Accordingly, in particular, in lifting and transportation of thin steel plates, control of the number of steel plates to be lifted, which has been difficult with existing lifting magnets, is easily achieved. Advantageously, this also makes the transporting operation of steel plates more efficient.

In a preferred embodiment, the lifting magnet to be used further includes a magnetic flux sensor that measures the amount of passing magnetic flux in the magnetic pole. The applied voltage for the electromagnet coil(s) is adjusted (by preferably feedback control) based on the measurement value of the magnetic flux sensor, thereby making it possible to control the magnetic flux penetration depth with higher accuracy.

DETAILED DESCRIPTION

The disclosed embodiments are directed to a method for lifting only at least one steel plate to be lifted (including a plurality of steel plates; the same applies to the following description) from among a plurality of stacked steel plates by using a lifting magnet. The disclosed embodiments are based on the use of a novel lifting magnet having a special configuration. That is, the lifting magnet of the disclosed embodiments includes a plurality of electromagnet coils 2 that are each independently ON/OFF-controllable and voltage-controllable, and a magnetic pole 3 that is excited by application of a voltage to these electromagnet coils 2 (i.e., a magnetic pole through which the magnetic flux generated by application of a voltage passes). As will be described below, according to a lifting magnet 1 having the configuration described above, when a large magnetic flux penetration depth (holding force) is required, the required magnetic flux penetration depth can be secured by simultaneously using the plurality of electromagnet coils 2. Further, at least one of the individual electromagnet coils 2 having a relatively small number of coil turns is selectively used to control the magnetic flux penetration depth with high accuracy.

The lifting magnet 1 used in the disclosed embodiments desirably includes the plurality of electromagnet coils 2, and the electromagnet coils 2 are not arranged in any special manner. However, the lifting magnet 1 particularly preferably includes a plurality of electromagnet coils 2 that are arranged concentrically or/and arranged vertically in layers, as will be described below.

An embodiment in which a lifting magnet including a plurality of electromagnet coils that are arranged concentrically is used will be described hereinafter.

Figure 1:
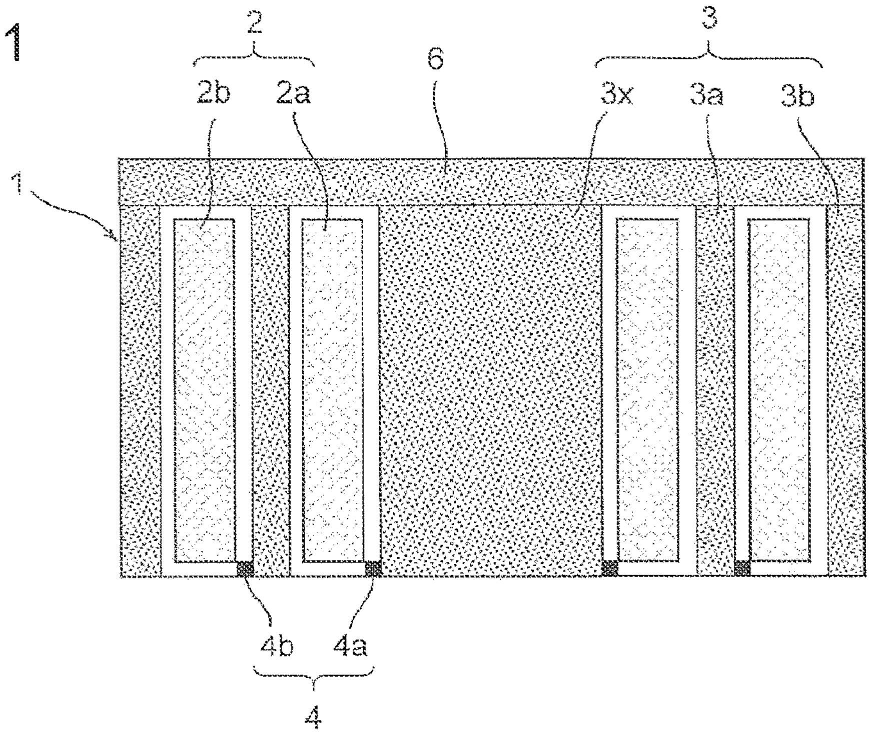
FIG. 1 is a vertical cross-sectional view schematically illustrating an embodiment of a lifting magnet including a plurality of electromagnet coils that are arranged concentrically.
Figure 2:
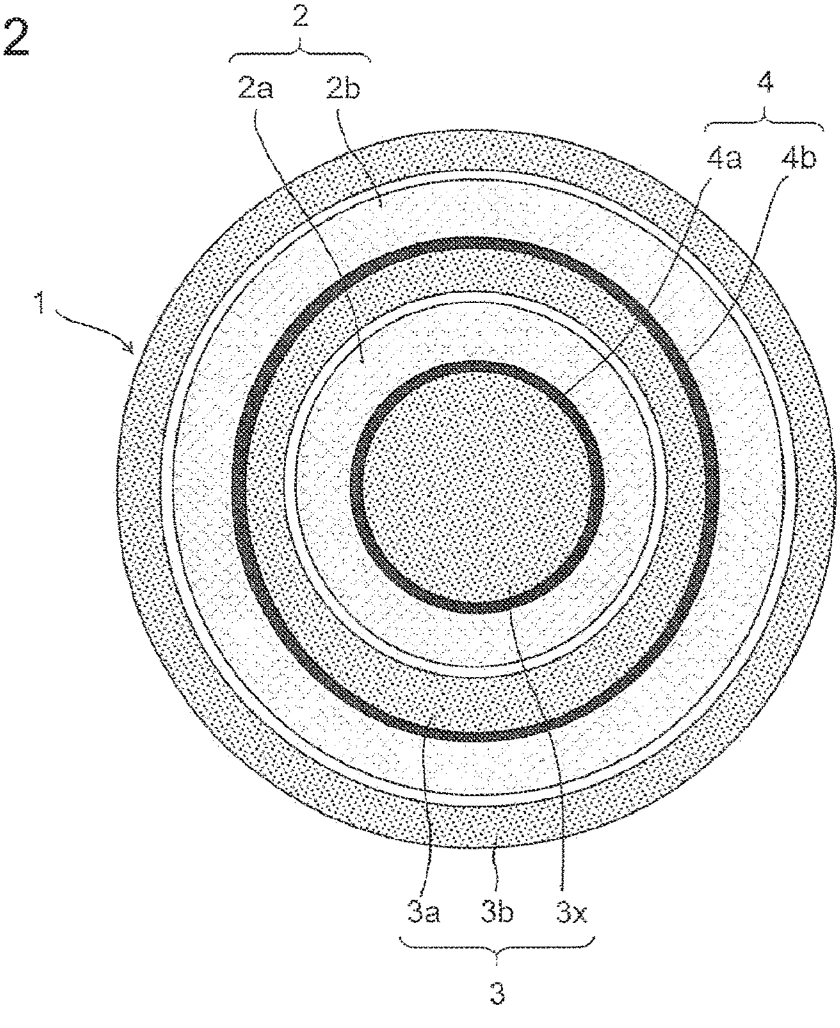
FIG. 2 is a horizontal cross-sectional view of the lifting magnet illustrated in FIG. 1.

FIGS. 1 and 2 schematically illustrate an embodiment of the lifting magnet 1 in which the plurality of electromagnet coils 2 are arranged concentrically, which is used in the disclosed embodiments. FIG. 1 is a vertical cross-sectional view of the lifting magnet 1, and FIG. 2 is a horizontal cross-sectional view of the lifting magnet 1. A typical lifting magnet is suspended and held in place by a crane (not illustrated) to raise, lower, and move objects.

The lifting magnet 1 of the present embodiment includes two electromagnet coils 2 that are arranged concentrically, that is, a first electromagnet coil **2*a* on the inner side and a second electromagnet coil 2*b*** on the outer side (hereinafter, "electromagnet coil" is simply referred to as "coil", for convenience of description).

The first coil **2*a* and the second coil 2*b* are, for example, insulated ring-shaped excitation coils that are formed by winding enameled copper wires a large number of turns, like coils included in an existing lifting magnet. The two coils 2*a* and 2*b* are arranged concentrically (in a nest structure) with an outer pole (outer pole iron core) interposed therebetween. Thus, the two coils 2*a* and 2*b*** have different ring diameters.

In the disclosed embodiments, the expression "the plurality of coils 2 that are arranged concentrically" means the plurality of coils 2 that are arranged in a nest structure, and the plurality of coils 2 need not be exactly "concentric".

An inner pole **3*x* (inner pole iron core) is arranged inside the first coil 2*a* on the inner side. A first outer pole 3*a* (ring-shaped outer pole iron core) is arranged outside the first coil 2*a*, that is, between the first coil 2*a* and the second coil 2*b*. A second outer pole 3*b* (ring-shaped outer pole iron core) is arranged outside the second coil 2*b*. Furthermore, a yoke 6 is arranged in contact with the respective upper ends of the inner pole 3*x* and the first and second outer poles 3*a* and 3*b*. The yoke 6 is secured to the respective upper ends of the inner pole 3*x* and the first and second outer poles 3*a* and 3*b***.

Although not illustrated, gaps between the coils 2 and the magnetic pole 3 and between the coils 2 and the yoke 6 are usually filled with a non-magnetic material (such as a resin, for example) to secure the coils 2 in place. The inner pole **3*x*, the first outer pole 3*a*, the second outer pole 3*b*, and the yoke 6** are typically made of a soft magnetic material such as mild steel. Accordingly, at least one or all of them may have an integral structure (may be configured as an integral member).

The lifting magnet 1 in which the plurality of electromagnet coils 2 are arranged concentrically, which is used in the disclosed embodiments, may include three or more coils that are arranged concentrically. Also in this case, the inner pole **3*x* is arranged inside the coil on the innermost side, and the outer poles 3*a*, 3*b***, etc. are sequentially arranged outside the respective coils. In this manner, three or more coils that are arranged concentrically are included, which advantageously achieves a large voltage control range in each case, for example, when the number of steel plates to be lifted is more finely specified, such as one, two to three, four to five, or six to seven.

The lifting magnet 1 used in the disclosed embodiments includes a plurality of coils that are arranged concentrically. For example, in the embodiment in FIGS. 1 and 2, the lifting magnet 1 includes the first coil 2*a* and the second coil 2*b*. Accordingly, when a large magnetic flux penetration depth (holding force) is required, the required magnetic flux penetration depth can be secured by simultaneously using (exciting) the plurality of coils. Further, at least one of the individual coils having a relatively small number of coil turns is used (excited) alone to control the magnetic flux penetration depth with high accuracy. For example, in the case of the embodiment in FIGS. 1 and 2, the first coil 2*a* or the second coil 2*b* is used (excited) alone to control the magnetic flux penetration depth with high accuracy. The principle thereof will now be described.

Figure 16:
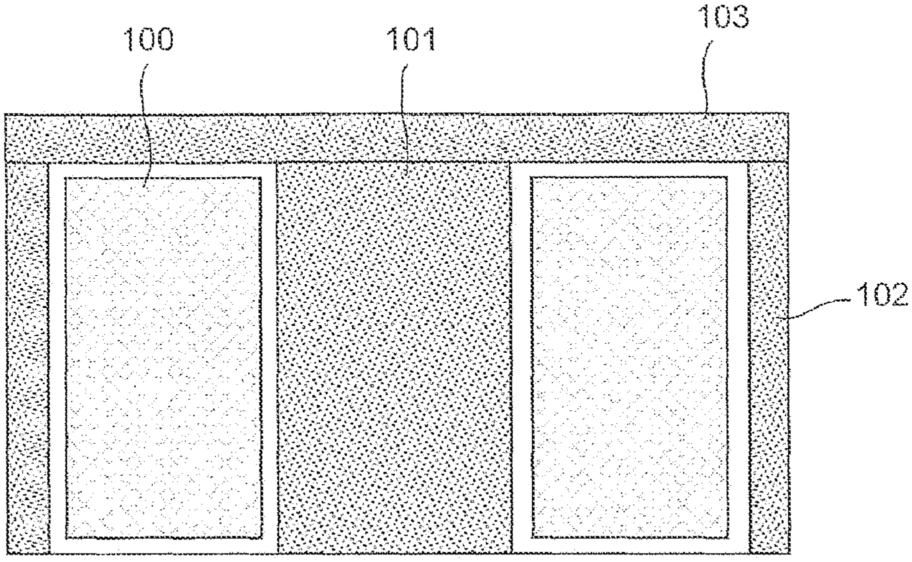
FIG. 16 is a vertical cross-sectional view schematically illustrating an existing typical lifting magnet.

Consideration will be given of the lifting of steel plates with the lifting magnet as illustrated in FIG. 16. In this case, when the diameter of the inner pole is $R_I$ (mm), the thickness of a steel plate to be lifted is t (mm), and the saturation magnetic flux density of the steel plate is $B_s$ (T), the amount of magnetic flux that can pass through the steel plate is expressed by $\Pi \times R_I \times t \times B_s$. Accordingly, when n stacked steel plates of the same material and the same thickness are attracted to and lifted with the lifting magnet, the following can be considered. That is, when the amount of magnetic flux generated by application of a voltage to the coil is M, if M satisfies formula (i) below, it is considered that the magnetic flux theoretically penetrates up to the lower surface of the n-th steel plate from the top, that is, up to a distance of $\Sigma_{k=1-n}(t_k)$ and that a sufficient lifting force is obtained.

$$M=\Pi \times R_I \times \Sigma_{k=1-n}(t_k) \times B_s \quad \text{(i)}$$

When the cross-sectional area of the inner pole is S (mm$^2$) and the average magnetic flux density of the inner pole is B (T), the amount of magnetic flux M is expressed by multiplying the cross-sectional area S by the average magnetic flux density B (S×B). Thus, formula (i) above is expressed by formula (ii) as follows.

$$S \times B=\Pi \times R_I \times \Sigma_{k=1-n}(t_k) \times B_s \quad \text{(ii)}$$

Since the average magnetic flux density B is proportional to the product of the number of turns N of the coil and a current I in the coil, formula (ii) above is expressed by formula (iii) as follows (α: constant of proportionality).

$$N \times I \times \alpha \times S=\Pi \times R_I \times \Sigma_{k=1-n}(t_k) \times B_s \quad \text{(iii)}$$

Here, decreasing the number of turns N of the coil decreases the amount of change in the value of the left side with respect to the amount of error of the current I. Accordingly, control for satisfying formula (iii), that is, control of the magnetic flux penetration depth, can be performed with high accuracy, and the number of thin steel plates to be lifted can be controlled.

Figure 3:
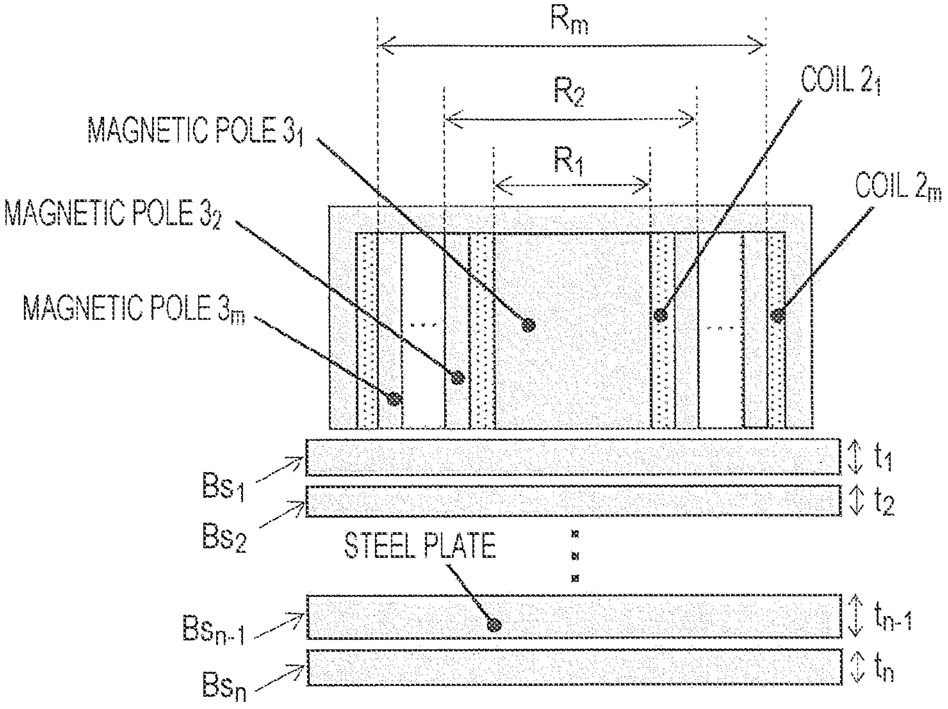
FIG. 3 is an explanatory diagram for explaining the principle of the disclosed embodiments.
Figure 4:
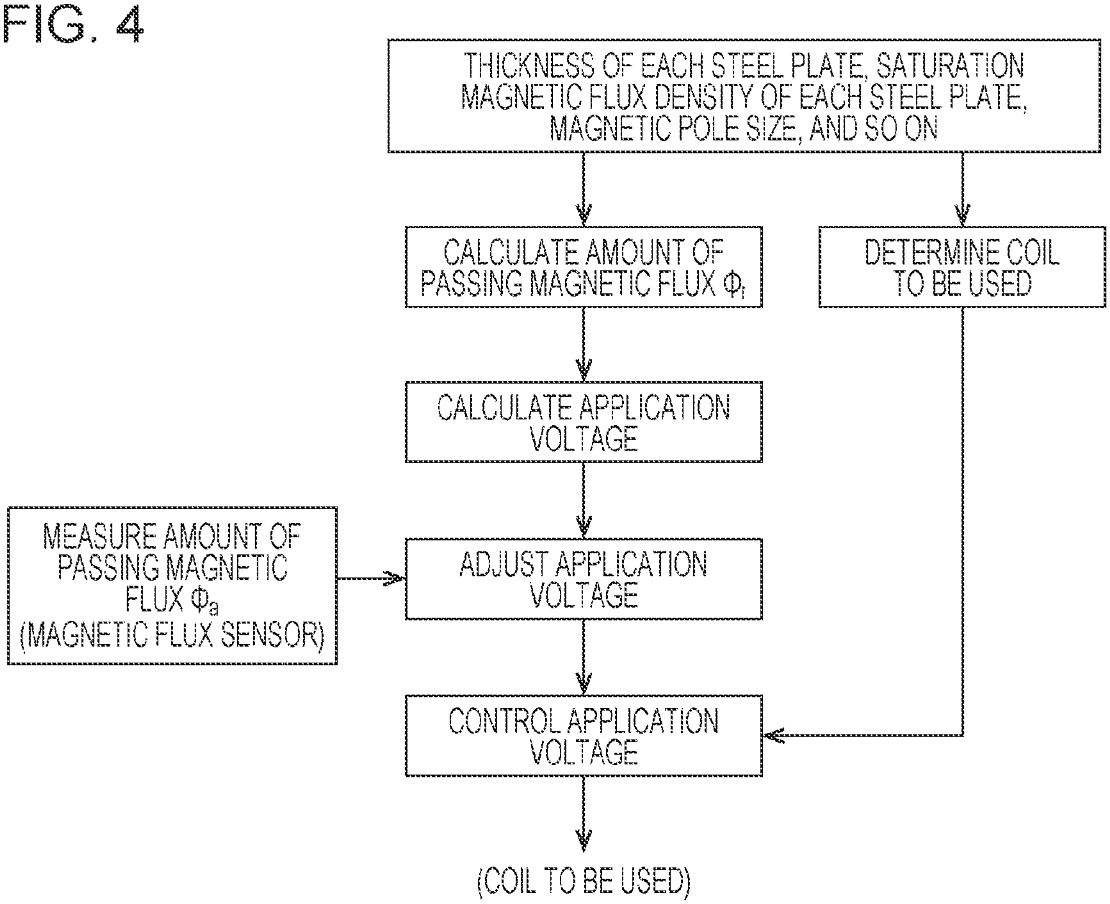
FIG. 4 is a flowchart illustrating a process of the disclosed embodiments.

FIG. 3 is an explanatory diagram (configuration diagram) for explaining the principle of the disclosed embodiments. FIG. 4 is a flowchart illustrating a process of the disclosed embodiments.

In the disclosed embodiments, an example will be described in which a lifting magnet 1 including m coils 2 (coils $\mathbf{2}_1$ to $\mathbf{2}_m$) as illustrated in FIG. 3 is used to lift only n steel plates to be lifted from among a plurality of stacked steel plates. First, a coil 2 to be used for lifting the steel plates is determined (selected) from among the plurality of coils 2 on the basis of the total thickness t of n steel plates to be lifted (n steel plates from the one closest to the coils 2), that is, the total thickness t (mm) represented by formula (1) below. In this case, all of the plurality of coils 2 may be used for lifting the steel plates, that is, may be selected as coils to be used for lifting the steel plates.

[Math. 1]

$$t=\Sigma_{k=1}^{n} t_k \quad (1)$$

For example, in the embodiment using the lifting magnet 1 in FIGS. 1 and 2, a coil 2 to be used for lifting the steel plates is determined (selected) in accordance with the total thickness t of the steel plates to be lifted. Specifically, a threshold is provided for the total thickness t of the steel plates to be lifted. If the total thickness is equal to or less than the threshold, only the first coil 2*a* is used. On the other hand, if the total thickness t exceeds the threshold, the first coil 2*a* and the second coil 2*b* are used.

Subsequently, the amount of passing magnetic flux $\Phi_r$ in the magnetic pole 3 in a case where the magnetic flux flowing out of the magnetic pole 3 passes through only the n steel plates to be lifted when the selected coil 2 is used (excited) is calculated. Here, the amount of passing magnetic flux $\Phi_r$ in the magnetic pole 3 is calculated based on the thickness of each steel plate to be lifted, the saturation magnetic flux density of each steel plate to be lifted, and the size (outer diameter) of the magnetic pole 3 inscribed in the outermost coil 2 among the coils to be used (excited). That is, when the outer diameter of the magnetic pole $\mathbf{3}_i$ inscribed in the outermost coil $\mathbf{2}_i$ ($1 \le i \le m$) among the coils 2 selected in the way described above is $R_i$ (mm), the thickness of each steel plate to be lifted is $t_k$ (mm), and the saturation magnetic flux density of each steel plate to be lifted is $Bs_k$ (T), the amount of passing magnetic flux $\Phi_r$ (T·mm$^2$) is calculated by formula (2) below. For example, in FIG. 3, if the coil $\mathbf{2}_1$ and the coil $\mathbf{2}_2$ (not illustrated) among the coils $\mathbf{2}_1$ to $\mathbf{2}_m$ are used, $R_i$ in formula (2) below is an outer diameter $R_2$ (mm) of the magnetic pole $\mathbf{3}_2$ inscribed in the outermost coil $\mathbf{2}_2$ among the coils $\mathbf{2}_1$ to $\mathbf{2}_m$.

[Math. 2]

$$\Phi_r=\pi R_i \Sigma_{k=1}^{n}(Bs_k \cdot t_k) \quad (2)$$

Figure 5:
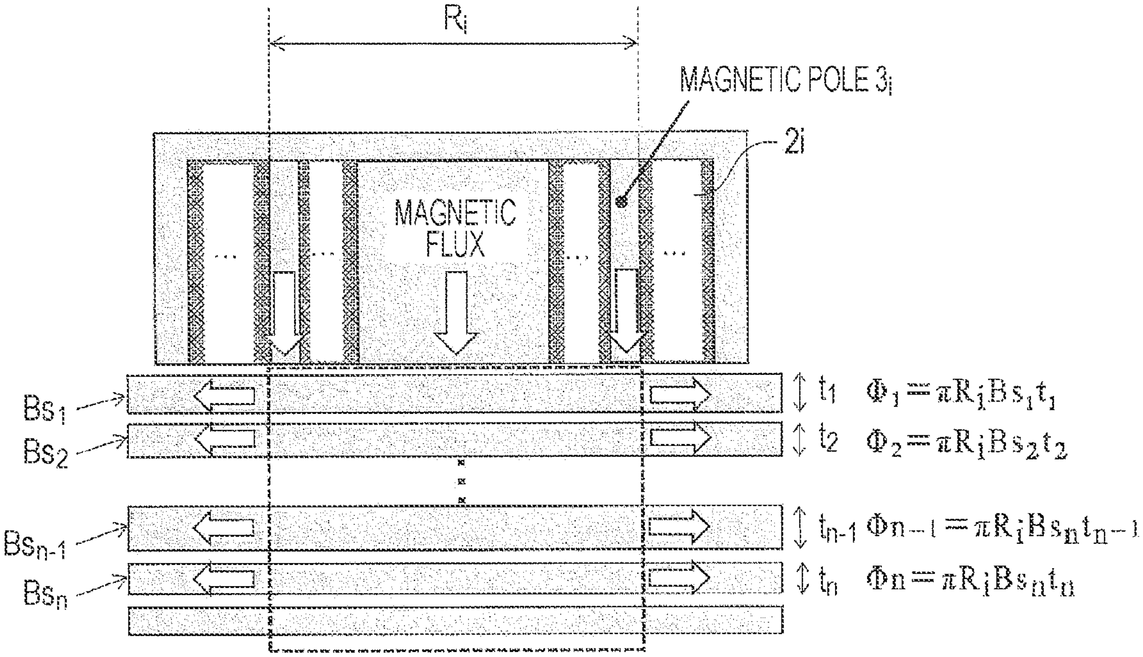
FIG. 5 is an explanatory diagram illustrating a flow of magnetic flux in stacked steel plates when at least one of the electromagnet coils is excited in the disclosed embodiments.

The theoretical basis of the amount of passing magnetic flux $\Phi_r$ will be described with reference to FIG. 5 illustrating the flow of magnetic flux in stacked steel plates. In the example illustrated in FIG. 5, the magnetic pole $\mathbf{3}_i$ is inscribed in the outermost coil $\mathbf{2}_i$ among the coils 2 to be used (excited). Immediately below the region surrounded by the magnetic pole $\mathbf{3}_i$, the magnetic flux flows in from the upper surfaces of the steel plates and flows out of the side surfaces of the steel plates. An upper limit Ok of the amount of magnetic flux flowing out for the k-th steel plate from the one closest to the coil is expressed by $\Phi_k = nR_i Bs_k t_k$ from the area $nR_i t_k$ of the side surface and the saturation magnetic flux density $Bs_k$. This indicates that the magnetic flux is allowed to pass through the n steel plates to be lifted by, desirably, making the amount of passing magnetic flux $\Phi_r$, which is represented by formula (2), flow out of the magnetic pole 3 to the steel plates.

Figure 6:
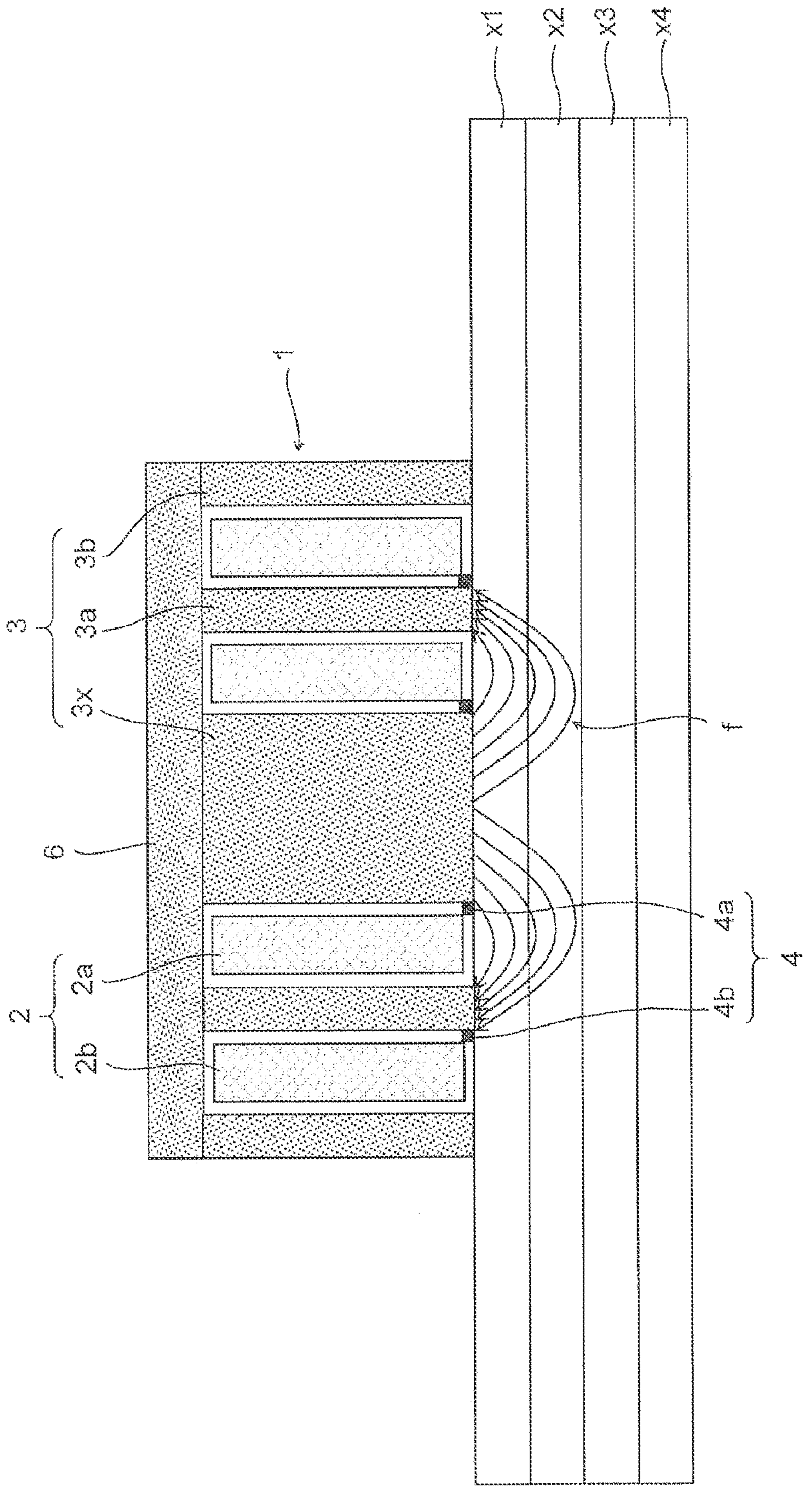
FIG. 6 is a drawing (a vertical cross-sectional view of the lifting magnet) illustrating a state in which the magnetic flux flowing out of a magnetic pole passes through only the steel plates to be lifted when the electromagnet coil on the inner side is excited in an embodiment using the lifting magnet in FIGS. 1 and 2.

Subsequently, an application voltage to be applied to the coil 2 to be used for lifting the steel plates is determined based on the calculated amount of passing magnetic flux $\Phi_r$, and the determined voltage is applied to the coil 2. Since the relationship between the application voltage and the amount of passing magnetic flux $\Phi_r$ is determined in advance, the voltage is applied based on the relationship. This leads to a state in which the magnetic flux flowing out of the magnetic pole 3 passes through only the n steel plates to be lifted, making it possible to lift only the n steel plates to be lifted from among the plurality of stacked steel plates. FIG. 6 illustrates an example of this state. In this state, steel plates x1 to x4 are stacked on top of each other, and magnetic flux f flowing out of the magnetic pole 3 (the inner pole 3*x*) passes through only the two steel plates x1 and x2 to be lifted. In this state, the lifting magnet 1 is raised by the crane to lift the steel plates x1 and x2 to be lifted.

In the disclosed embodiments, preferably, after the lifting of the steel plates with the lifting magnet 1 is started, (iv) and/or (v) below is performed before the lifting magnet 1 with which the steel plates are lifted is moved, to prevent falling of the lifted steel plates.

(iv) Increase of the application voltage for the coil 2 being used for lifting the steel plates.

(v) Application of a voltage to one or more other coils 2 in addition to the coil 2 being used for lifting the steel plates.

The matters described in (iv) above correspond to the matters described in (I) increasing the application voltage for the electromagnet coil being used for lifting the at least one steel plate, and the matters described in (v) correspond to the matters described in (II) applying a voltage to one or more other electromagnet coils in addition to the electromagnet coil being used for lifting the at least one steel plate.

Figure 7:
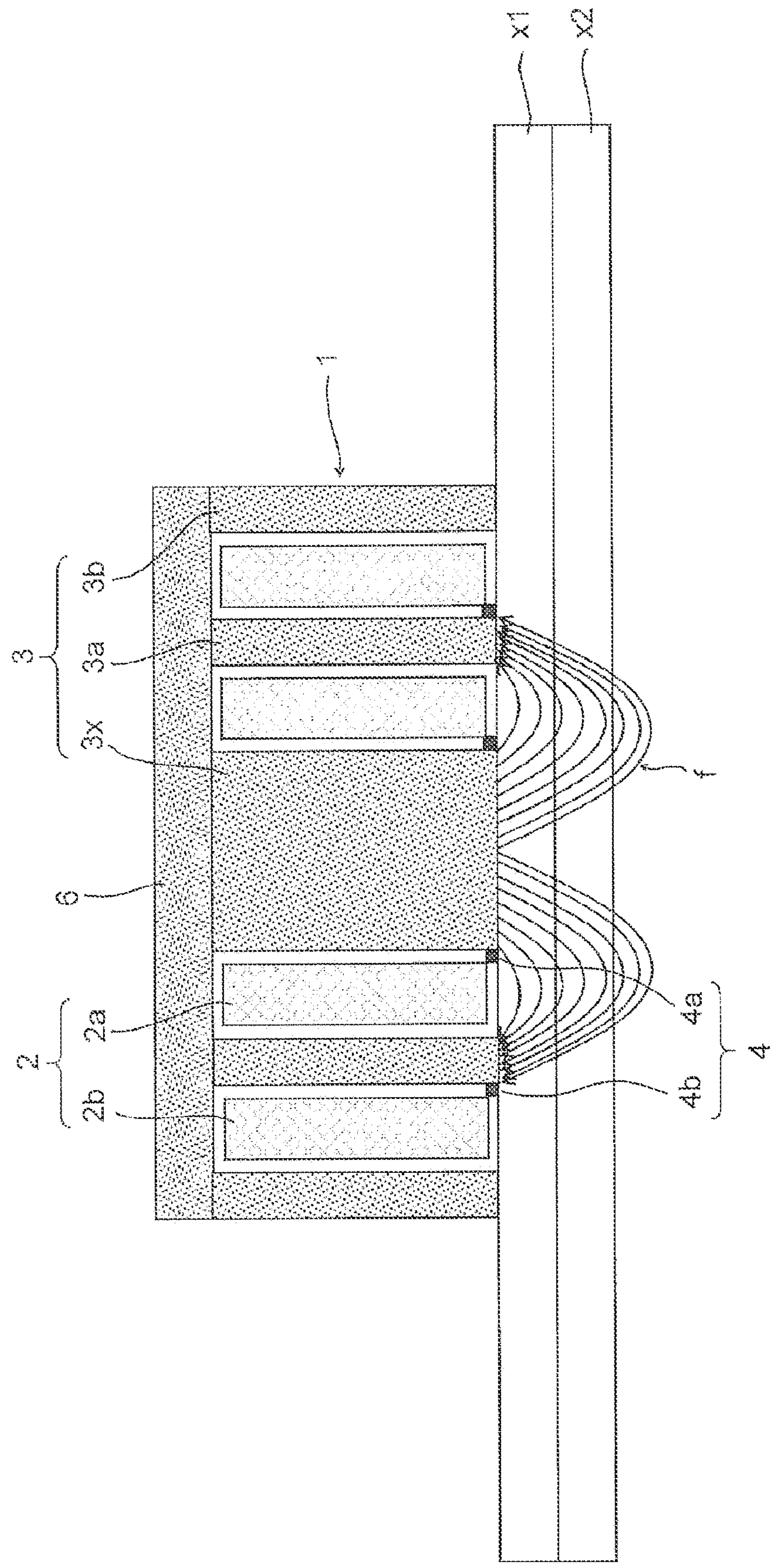
FIG. 7 is a drawing (a vertical cross-sectional view of the lifting magnet) illustrating a state in which after the steel plates are lifted from the state in FIG. 6, an application voltage to be applied to the electromagnet coil on the inner side is increased to increase the amount of magnetic flux (magnetic flux penetration depth).
Figure 8:
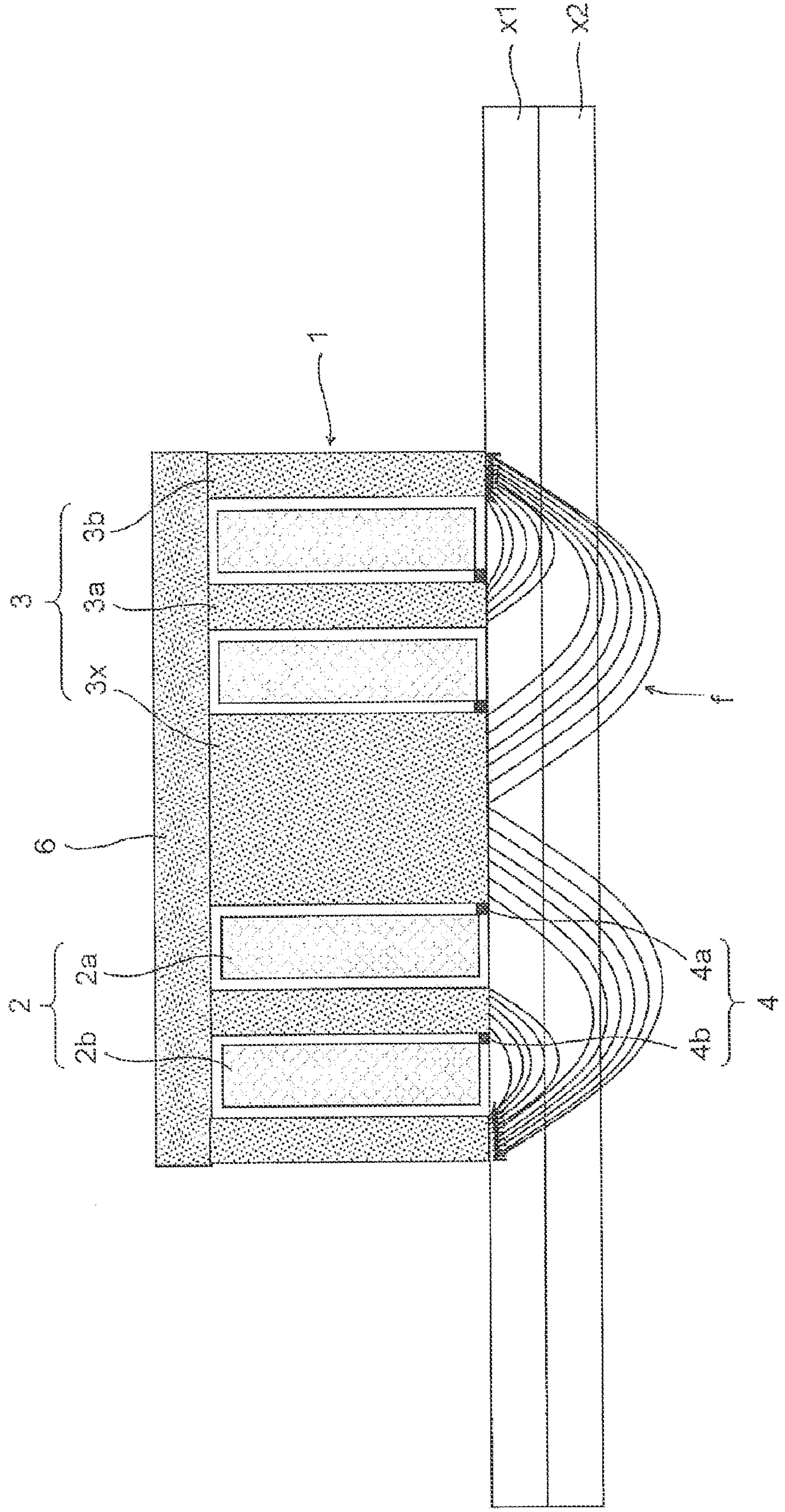
FIG. 8 is a drawing (a vertical cross-sectional view of the lifting magnet) illustrating a state in which after the steel plates are lifted from the state in FIG. 6, not only the electromagnet coil on the inner side being used but also the electromagnet coil on the outer side is excited to increase the amount of magnetic flux (magnetic flux penetration depth).

FIG. 7 illustrates an example of (iv) above. The increase of an application voltage to be applied to the first coil 2*a*, which is being used, increases the amount of magnetic flux (magnetic flux penetration depth) from the state in FIG. 6. This further ensures that the steel plates x1 and x2 can be lifted and held in place (attracted). FIG. 8 illustrates an example of (v) above. The application of a voltage also to the second coil 2*b*, in addition to the first coil 2*a* being used, for excitation increases the amount of magnetic flux (magnetic flux penetration depth) from the state in FIG. 6. This further ensures that the steel plates x1 and x2 can be lifted and held in place (attracted).

In a preferred embodiment, the lifting magnet 1 may include a magnetic flux sensor 4 that measures the amount of passing magnetic flux $\Phi_a$ in the magnetic pole 3. When a voltage is to be applied to the coils 2, an application voltage is adjusted (controlled) so that the difference between the amount of passing magnetic flux $\Phi_a$ in the magnetic pole 3 (actual measurement value), which is measured by the magnetic flux sensor 4, and the amount of passing magnetic flux $\Phi_r$ (target value), which is calculated in the way described above, is equal to or less than a threshold. The adjustment (control) of the application voltage is preferably performed by feedback control.

Accordingly, the lifting magnet of the embodiment in FIGS. 1 and 2 includes a magnetic flux sensor 4 (4*a* and 4*b*) for measuring the amount of passing magnetic flux $\Phi_a$ in the magnetic pole 3. The amount of passing magnetic flux $\Phi_a$ in the magnetic pole 3, which is measured by the magnetic flux sensor 4, is used to determine the thickness of the steel plates (the number of steel plates) that are attracted due to the passage of magnetic flux. Accordingly, the application voltage is adjusted (controlled) so that the difference between the amount of passing magnetic flux $\Phi_a$ in the magnetic pole 3 (actual measurement value), which is measured by the magnetic flux sensor 4, and the amount of passing magnetic flux $\Phi_r$ (target value), which is calculated in the way described above, is equal to or less than a threshold. This makes it possible to lift the steel plates (lift only the steel plates to be lifted) with higher accuracy.

The level of the threshold is not particularly limited. However, typically, it is preferable that the threshold is set to a value equal to or less than 10% of the amount of passing magnetic flux $\Phi_r$ (target value).

Examples of the magnetic flux sensor 4 include a search coil and a Hall element. In the present embodiment, the magnetic flux sensor 4 is constituted by a search coil.

The magnetic flux sensor 4 may be attached at any position where the amount of passing magnetic flux in the magnetic pole can be measured. In the embodiment in FIGS. 1 and 2, the magnetic flux sensor 4*a* is attached to a lower end of the outer circumference of the inner pole 3*x* and the magnetic flux sensor 4*b* is attached to a lower end of the outer circumference of the first outer pole 3*a* to measure the amounts of passing magnetic flux passing through the inner pole 3*x* and the first outer pole 3*a*. A plurality of magnetic flux sensors 4 may be disposed at different positions in the magnetic pole (inner pole and outer pole).

As in the embodiment in FIGS. 1 and 2, when the lifting magnet 1 includes a plurality of coils 2 that are arranged concentrically, at least one or all of the plurality of coils 2 are selectively used. Accordingly, the magnetic flux sensor 4 is preferably disposed in each of the magnetic poles 3 (including the inner pole 3*x*) other than the outermost outer pole.

When the magnetic flux sensor 4 is constituted by a Hall element, the magnetic flux sensor 4 is typically attached so as to be embedded in a lower end of the magnetic pole.

Figure 9:
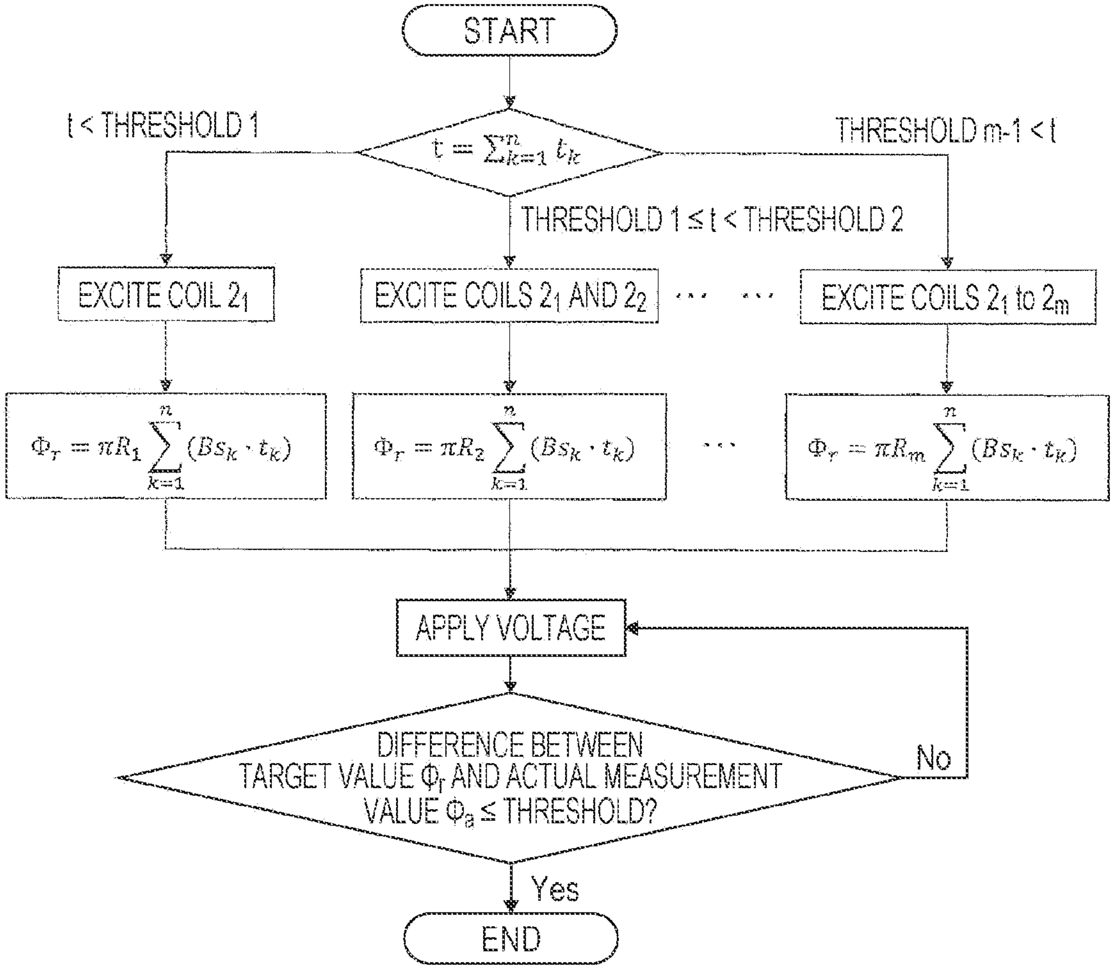
FIG. 9 is an example of a steel plate lifting control flowchart according to the disclosed embodiments.

FIG. 9 illustrates an example of the control flow when steel plates are to be lifted according to the disclosed embodiments.

First, the total thickness t of the steel plates to be lifted is determined from the number n of steel plates to be lifted from among a plurality of stacked steel plates (the number n of steel plates to be lifted) and thicknesses $t_1, t_2, t_3, \ldots,$ and $t_n$ of the steel plates. A coil 2 to be used for lifting the steel plates is determined in accordance with the total thickness t. Accordingly, the coils 2 to be used are determined in advance in accordance with the range of the total thickness t. For example, the number of coils is m. In this case, a plurality of different thresholds 1 to m-1 (e.g., the threshold 1: 10 mm, the threshold 2: 20 mm, . . . the threshold m-1: 50 mm) are set in a stepwise manner. If the total thickness t is less than the threshold 1 (total thickness t<threshold 1), only the first coil $\mathbf{2}_1$ is used. If the total thickness t is equal to or greater than the threshold 1 and less than the threshold 2 (threshold 1≤total thickness t<threshold 2), the first coil $\mathbf{2}_1$ and the second coil $\mathbf{2}_2$ are used. Likewise, if the total thickness t is greater than the threshold m-1 (threshold m-1<total thickness t), the first coil $\mathbf{2}_1$ to the m-th coil $\mathbf{2}_m$ are used. In this way, the coil or coils 2 to be used for lifting the steel plates are determined. When the number of coils is two as illustrated in FIGS. 1 and 2, only one threshold (e.g., 10 mm) is set. If the total thickness t is less than the threshold (total thickness t<threshold), only the first coil 1*a* is used. If the total thickness t is equal to or greater than the threshold (total thickness t≥threshold), the first coil 1*a* and the second coil 1*b* are used. In this way, the coil or coils 2 to be used for lifting the steel plates are determined.

FIG. 9 indicates that the coils $\mathbf{2}_1$ to $\mathbf{2}_i$ ($1 \le i \le m$) are excited in accordance with the total thickness t. However, this is an example, and only the coil $\mathbf{2}_i$ may be excited, for example.

Subsequently, the amount of passing magnetic flux $\Phi_r$ in the magnetic pole 3 (target value) in a case where the magnetic flux flowing out of the magnetic pole 3 passes through only the n steel plates to be lifted when the coils 2 are used is calculated from formula (2) above. Since the application voltage value for obtaining the predetermined amount of passing magnetic flux $\Phi_r$ is determined in advance, an application voltage to be applied to the coils 2 is determined based on the calculated amount of passing magnetic flux $\Phi_r$, and the determined voltage is applied to the coils 2.

Since the application (excitation) of the voltage to the coils 2 generates magnetic flux, the amount of passing magnetic flux $\Phi_a$ in the magnetic pole 3 is measured by the magnetic flux sensor 4. The difference between the amount of passing magnetic flux $\Phi_a$ (actual measurement value), which is measured by the magnetic flux sensor 4, and the amount of passing magnetic flux $\Phi_r$ (target value), which is calculated in the way described above, is compared with a threshold. If the difference is equal to or less than the threshold (difference threshold), it is determined that the magnetic flux passes through only the n steel plates to be lifted. Accordingly, the lifting magnet 1, which is held in place by the crane, is raised to start lifting the steel plates.

On the other hand, if the difference is greater than the threshold (difference>threshold), the application voltage is adjusted until the difference becomes equal to or less than the threshold (difference≤threshold). If the difference becomes equal to or less than the threshold (difference≤threshold), lifting of the steel plates is started. Such adjustment (control) of the application voltage for the coils 2 is preferably performed by feedback control by a control device 5 as described below.

The lifting magnet 1, which is held in place by the crane, is raised, and the steel plates to be lifted are lifted with the lifting magnet 1. In this state, preferably, the number of lifted steel plates is checked again by measurement of the amount of passing magnetic flux by the magnetic flux sensor 4, weight measurement by a load cell, and the like. In addition, the application voltage is increased or any other coil 2 is additionally excited to prevent falling of the steel plates. As a result, the amount of magnetic flux passing through the steel plates (magnetic flux penetration depth) is increased. Thereafter, the crane is traversed to transport the lifted steel plates.

Figure 10:
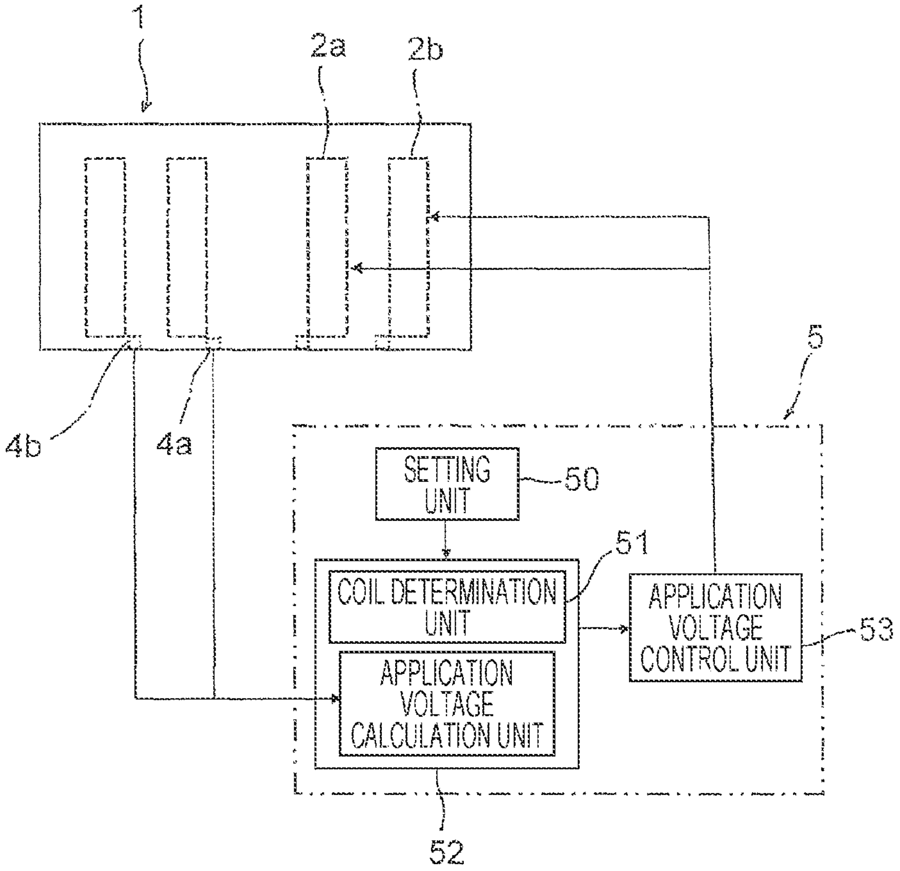
FIG. 10 is an explanatory diagram (device configuration diagram) illustrating an embodiment of a control device for automatically controlling the operation of lifting steel plates with the lifting magnet in FIGS. 1 and 2.

FIG. 10 is an explanatory diagram (device configuration diagram) illustrating an embodiment of the control device 5 for automatically controlling the operation of lifting steel plates with the lifting magnet 1 including the two coils 2*a* and 2*b* as illustrated in FIGS. 1 and 2. When only steel plates to be lifted are to be lifted from among a plurality of stacked steel plates, the control device 5 determines (selects) a coil 2 to be used for lifting the steel plates on the basis of the total thickness t of the steel plates to be lifted. Then, the control device 5 calculates the amount of passing magnetic flux $\Phi_r$ in the magnetic pole 3 in a case where the magnetic flux flowing out of the magnetic pole 3 passes through only the steel plates to be lifted when the coil 2 is used. The control device 5 is configured to determine an application voltage to be applied to the coil 2 used for lifting the steel plates on the basis of the amount of passing magnetic flux $\Phi_r$ and apply the determined voltage to the coil 2.

The lifting magnet 1 may include a magnetic flux sensor 4 that measures the amount of passing magnetic flux in the magnetic pole 3. In a case where the lifting magnet 1 includes the magnetic flux sensor 4, when applying a voltage to the coil 2, the control device 5 further adjusts (controls) the application voltage for the coil 2 so that the difference between the calculated amount of passing magnetic flux $\Phi_r$ in the magnetic pole 3 (target value) and the amount of passing magnetic flux $\Phi_a$ in the magnetic pole 3 (actual measurement value), which is measured by the magnetic flux sensor 4, is equal to or less than a threshold. Preferably, the control device 5 is configured to adjust the application voltage by using feedback control.

Accordingly, the control device 5 in FIG. 10 includes a setting unit 50, a coil determination unit 51, an application voltage calculation unit 52, an application voltage control unit 53, and so on. The thickness of each steel plate to be lifted, the saturation magnetic flux density of each steel plate to be lifted, the number of steel plates to be lifted, the size (outer diameter) of each magnetic pole, and so on are input to and set in the setting unit 50. The coil determination unit 51 determines the total thickness t of the steel plates to be lifted from the thicknesses of the steel plates to be lifted and the number of steel plates to be lifted, which are set in the setting unit 50. The coil determination unit 51 determines a coil 2 to be used for lifting the steel plates on the basis of the total thickness t. The application voltage calculation unit 52 calculates the amount of passing magnetic flux $\Phi_r$ in the magnetic pole 3 (target value) on the basis of the thickness of each steel plate to be lifted, the saturation magnetic flux density of each steel plate to be lifted, and the magnetic pole size (outer diameter), which are set in the setting unit 50. The application voltage calculation unit 52 calculates an application voltage to be applied to the coil 2 used for lifting the steel plates on the basis of the calculated amount of passing magnetic flux $\Phi_r$, and outputs the application voltage to the application voltage control unit 53. Further, the application voltage calculation unit 52 determines the difference between the calculated amount of passing magnetic flux $\Phi_r$ (target value) and the amount of passing magnetic flux $\Phi_a$ in the magnetic pole 3 (actual measurement value), which is measured by the magnetic flux sensor 4, and performs feedback control so that the difference becomes equal to or less than a threshold to adjust the application voltage. The application voltage control unit 53 is capable of performing ON/OFF control and voltage control on the first coil 2*a* and the second coil 2*b* independently of each other. The application voltage control unit 53 applies the voltage calculated and adjusted by the application voltage calculation unit 52 to the coil 2 (the first coil 2*a* or/and the second coil 2*b*).

The control device 5 having the configuration described above to automatically control the lifting of steel plates is included, which allows lifting control to be performed with particularly high accuracy and a more efficient lifting and transporting operation of steel plates.

Figure 11:
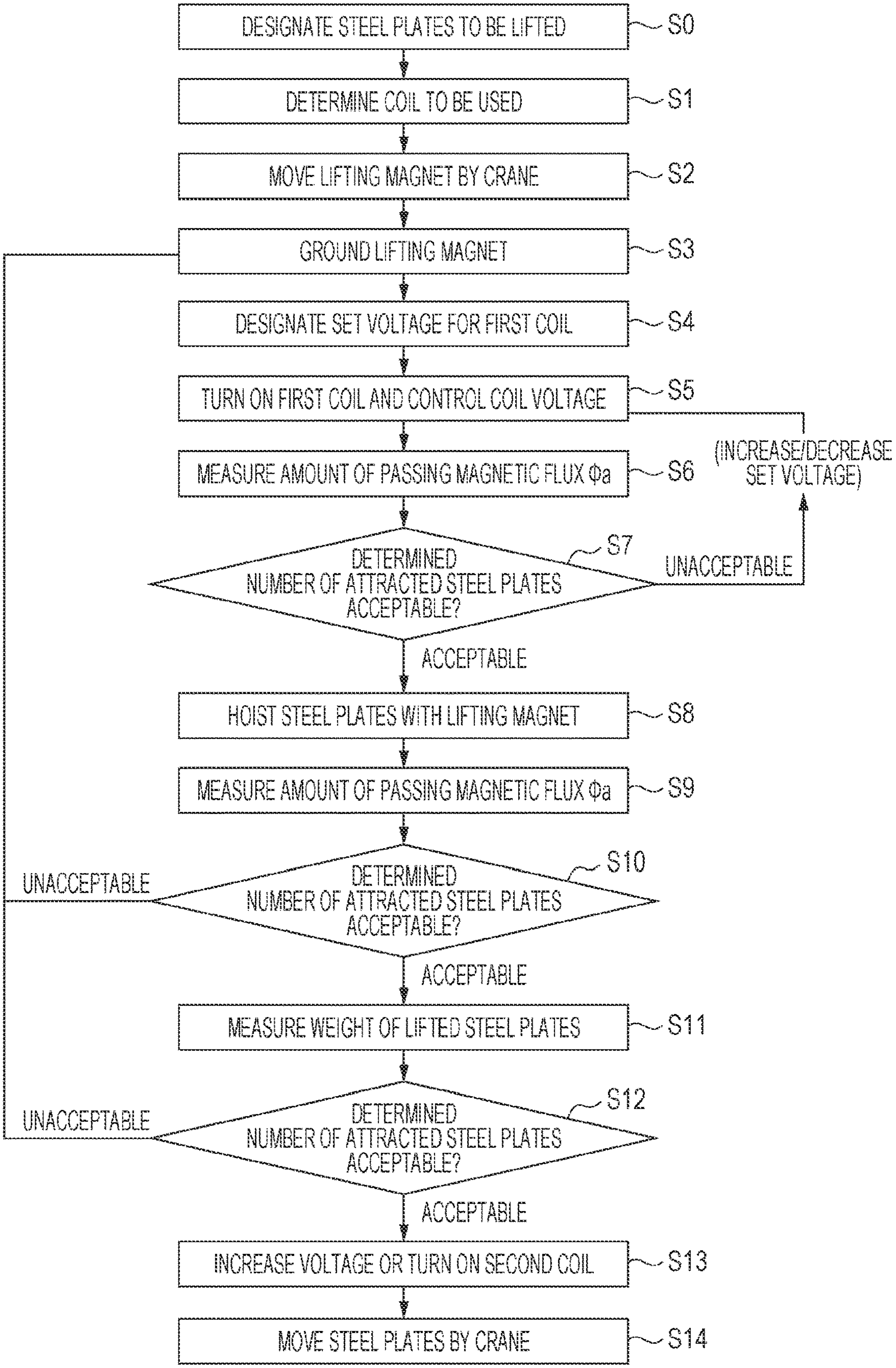
FIG. 11 is a flowchart illustrating an example of a procedure of steel plate lifting control, which is executed by the control mechanism as illustrated in FIG. 10.

FIG. 11 is a flowchart illustrating an example of a procedure of steel plate lifting control (control of the number of steel plates to be lifted), which is executed by the control mechanism as illustrated in FIG. 10. According to this, when the thicknesses of the steel plates to be lifted (to be transported) and the number of steel plates to be lifted are designated (S0), a coil 2 to be used is determined based on the total thickness t of the steel plates to be lifted (S1). In the example illustrated in FIG. 11, it is determined to use the first coil 2*a*. The lifting magnet 1 is moved by a crane to a position above the steel plates to be lifted (S2), and is grounded on the upper surface of the steel plates (S3). The amount of passing magnetic flux $\Phi_r$ in the magnetic pole 3 (target value) is determined based on the thickness of each steel plate to be lifted, the saturation magnetic flux density, and the magnetic pole size, and an application voltage to be applied to the first coil 2*a* is designated in accordance with the determined amount of passing magnetic flux $\Phi_r$ (S4). Subsequently, the voltage is applied to only the first coil 2*a*, and voltage control is performed (S5). As a result, a number of steel plates corresponding to the application voltage are attracted to the lifting magnet 1. The amount of passing magnetic flux $\Phi_a$ in the magnetic pole 3 is measured by the magnetic flux sensor 4 (S6), and the number of attracted steel plates is determined based on whether the difference between the amount of passing magnetic flux $\Phi_a$ (actual measurement value) and the amount of passing magnetic flux $\Phi_r$ (target value) is equal to or less than a threshold (S7). If the difference exceeds the threshold, that is, if the number of steel plates is unacceptable (if the number of steel plates does not match the designated number of steel plates), the process returns to S5 described above, and voltage control (feedback control) is performed to increase or decrease the application voltage for the first coil 2*a*. On the other hand, if the difference is equal to or less than the threshold, that is, if the number of steel plates is acceptable (if the number of steel plates matches the designated number of steel plates), the steel plates are lifted (hoisted) (S8).

The amount of passing magnetic flux $\Phi_a$ (actual measurement value) is measured again by the magnetic flux sensor 4 (S9) to check again the number of lifted steel plates in the state where the steel plates are lifted in the manner described above, that is, in the state before the steel plates are moved with the steel plates lifted. The number of attracted steel plates is determined based on whether the difference between the amount of passing magnetic flux $\Phi_a$ (actual measurement value) and the amount of passing magnetic flux $\Phi_r$ (target value) is equal to or less than a threshold (S10). If the difference exceeds the threshold, that is, if the number of steel plates is unacceptable (if the number of steel plates does not match the designated number of steel plates), the process returns to S3 described above, and the steel plates are lowered to the original position and grounded. On the other hand, if the difference is equal to or less than the threshold in S10, that is, if the number of steel plates is acceptable (if the number of steel plates matches the designated number of steel plates), the weight of the lifted steel plates is further measured by a weight measurement means or the like attached to a means for suspending the lifting magnet 1 (S11). The number of attracted steel plates is determined based on the measured weight (S12). If the number of steel plates is unacceptable (if the number of steel plates does not match the designated number of steel plates), the process returns to S3 described above, and the steel plates are lowered to the original position and grounded. On the other hand, if the number of steel plates is acceptable in S12 (if the number of steel plates matches the designated number of steel plates), the application voltage for the first coil 2*a* is increased to prevent falling of the lifted steel plates. Alternatively, the voltage is also applied to the second coil 2*b* in addition to the first coil 2*a* (S13). Thereafter, the movement (transportation of the lifted steel plates) by the crane is started (S14).

In the embodiment described above, the lifting magnet 1 including a plurality of coils 2 that are arranged concentrically is used. In an alternative embodiment, for example, (vi) a lifting magnet 1 including a plurality of coils 2 that are arranged vertically in layers or (vii) a lifting magnet 1 including a plurality of coils 2 that are arranged concentrically and arranged vertically in layers may be used.

Figure 12:
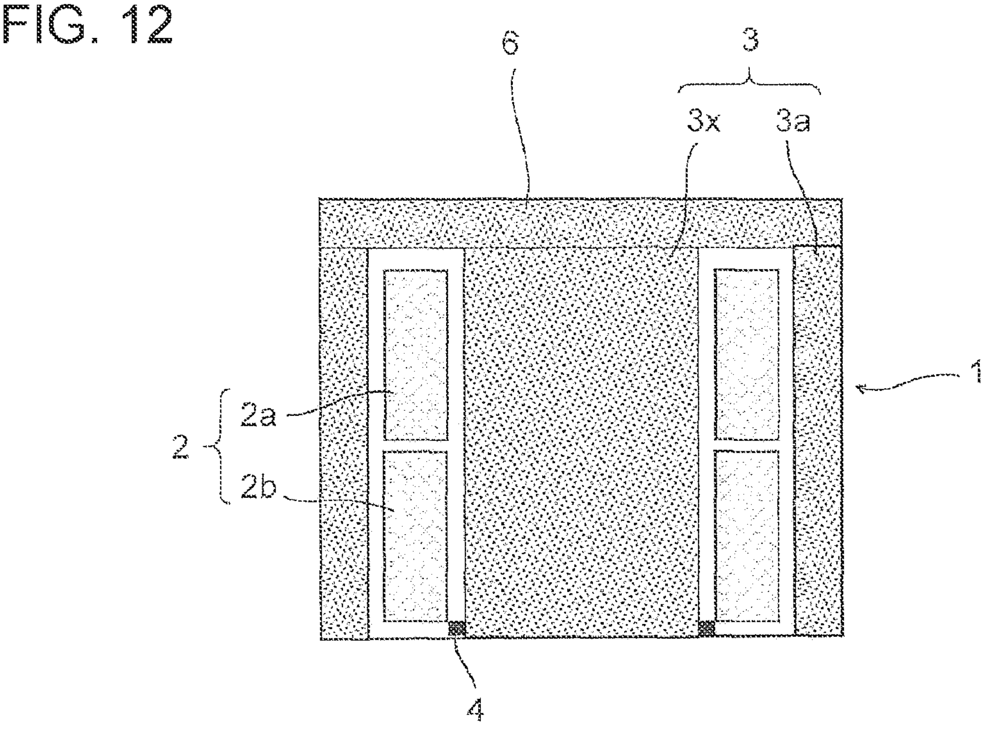
FIG. 12 is a vertical cross-sectional view schematically illustrating an embodiment of a lifting magnet including a plurality of electromagnet coils that are arranged vertically in layers.

FIG. 12 illustrates a lifting magnet including a plurality of coils 2 that are arranged vertically in layers (the lifting magnet (vi) described above). In this example, ring-shaped first and second coils 2*a* and 2*b* are arranged in two upper and lower layers between an inner pole 3*x* (inner pole iron core) and an outer pole 3*a* (ring-shaped outer pole iron core). A yoke 6 is arranged in contact with the respective upper ends of the inner pole 3*x* and the outer pole 3*a*. The yoke 6 is secured to the upper end of the inner pole 3*x* and the upper end of the outer pole 3*a*. Other configurations are the same as those described in the embodiment in FIGS. 1 and 2. The coils 2 may be disposed vertically in three or more layers.

Figure 13:
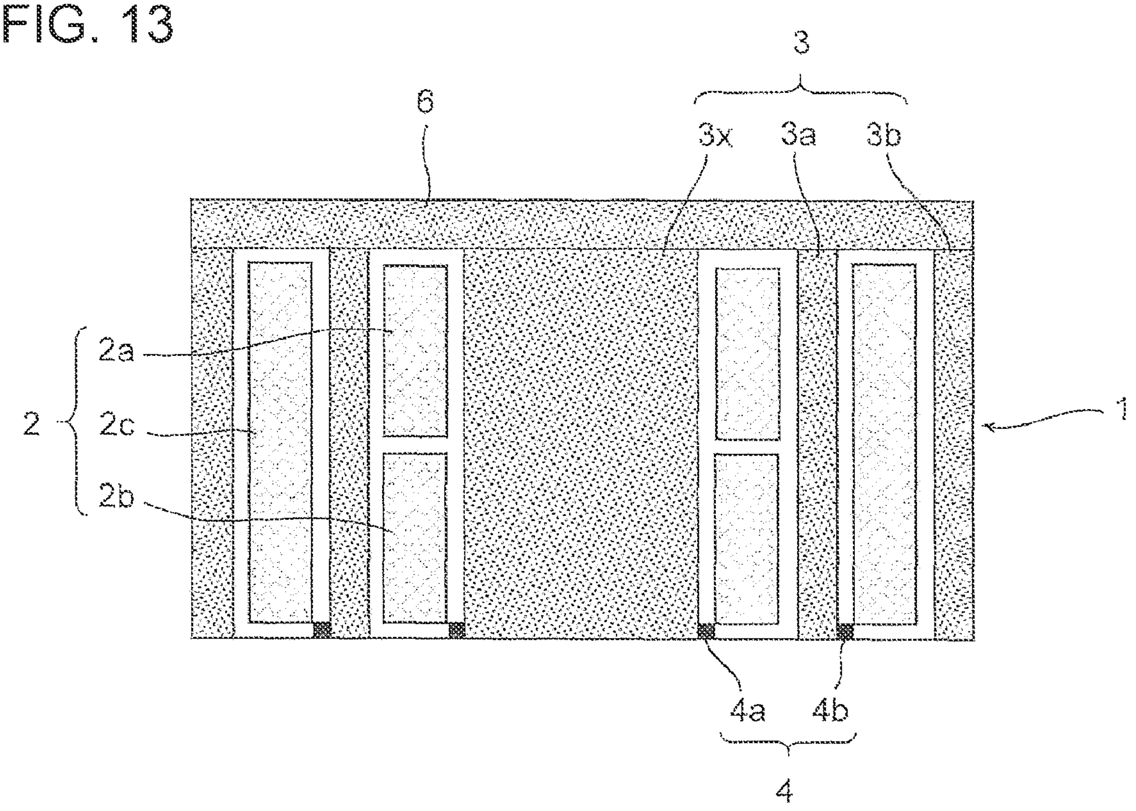
FIG. 13 is a vertical cross-sectional view schematically illustrating an embodiment of a lifting magnet including a plurality of electromagnet coils that are arranged concentrically and arranged vertically in layers.

FIG. 13 illustrates a lifting magnet including a plurality of coils 2 that are arranged concentrically and arranged vertically in layers (the lifting magnet (vii) described above). In this example, two sets of coils 2 arranged concentrically are included. The coils 2 on the inner side include ring-shaped first and second coils 2*a* and 2*b* that are arranged in two upper and lower layers, and the coils on the outer side include a ring-shaped third coil 2*c*. An inner pole 3*x* (inner pole iron core) is arranged inside the first and second coils 2*a* and 2*b* on the inner side. A first outer pole 3*a* (ring-shaped outer pole iron core) is arranged outside the first and second coils 2*a* and 2*b*, that is, between the third coil 2*c* and the first and second coils 2*a* and 2*b*. A second outer pole 3*b* (ring-shaped outer pole iron core) is arranged outside the third coil 2*c*. Furthermore, a yoke 6 is arranged in contact with the respective upper ends of the inner pole 3*x* and the first and second outer poles 3*a* and 3*b*. The yoke 6 is secured to the respective upper ends of the inner pole 3*x* and the first and second outer poles 3*a* and 3*b*. Other configurations are the same as those described in the embodiment in FIGS. 1 and 2. Note that three or more sets of coils 2 may be disposed concentrically, and coils 2 may be disposed vertically in three or more layers.

In the disclosed embodiments, even in a case where the lifting magnet 1 as illustrated in FIG. 12 or 13 is used, as in the case where the lifting magnet 1 as illustrated in FIGS. 1 and 2 is used, when a large magnetic flux penetration depth (holding force) is required, the required magnetic flux penetration depth can be secured by simultaneously using (exciting) the plurality of coils 2. Further, at least one of the individual coils 2 having a relatively small number of coil turns is used (excited) alone to control the magnetic flux penetration depth with high accuracy. Even in a case where the lifting magnet 1 having the configuration described above is used, a coil 2 to be used for lifting the steel plates is determined based on the total thickness t of the steel plates to be lifted, in accordance with the content described above with reference to FIGS. 3 to 11. Then, the amount of passing magnetic flux Φr in the magnetic pole 3 in a case where the magnetic flux flowing out of the magnetic pole 3 passes through only the steel plates to be lifted when the coil 2 is used is calculated. An application voltage to be applied to the coil 2 used for lifting the steel plates is determined based on the calculated amount of passing magnetic flux $\Phi_r$. Then, the determined voltage is applied to the coil 2 to lift only the steel plates to be lifted from among the plurality of stacked steel plates. Preferably, when a voltage is to be applied to the coil 2, the application voltage for the coil 2 is adjusted (by preferably feedback control) so that the difference between the calculated amount of passing magnetic flux $\Phi_r$ in the magnetic pole 3 (target value) and the amount of passing magnetic flux $\Phi_a$ in the magnetic pole 3 (actual measurement value), which is measured by the magnetic flux sensor 4, is equal to or less than a threshold.

Example

Figure 14:
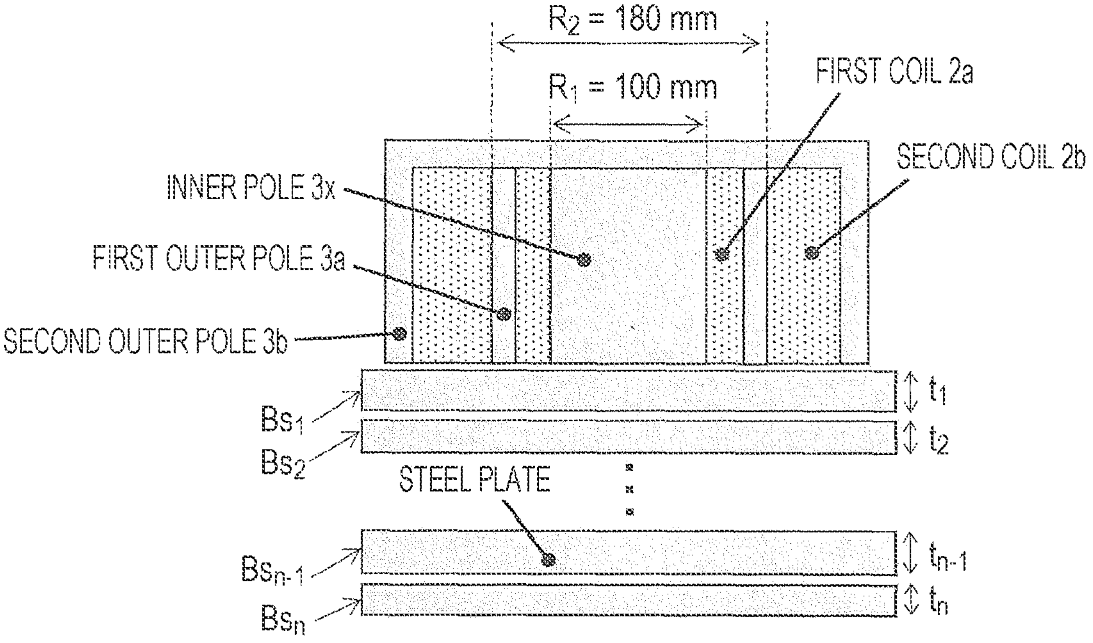
FIG. 14 is a configuration diagram according to an Example.
Figure 15:
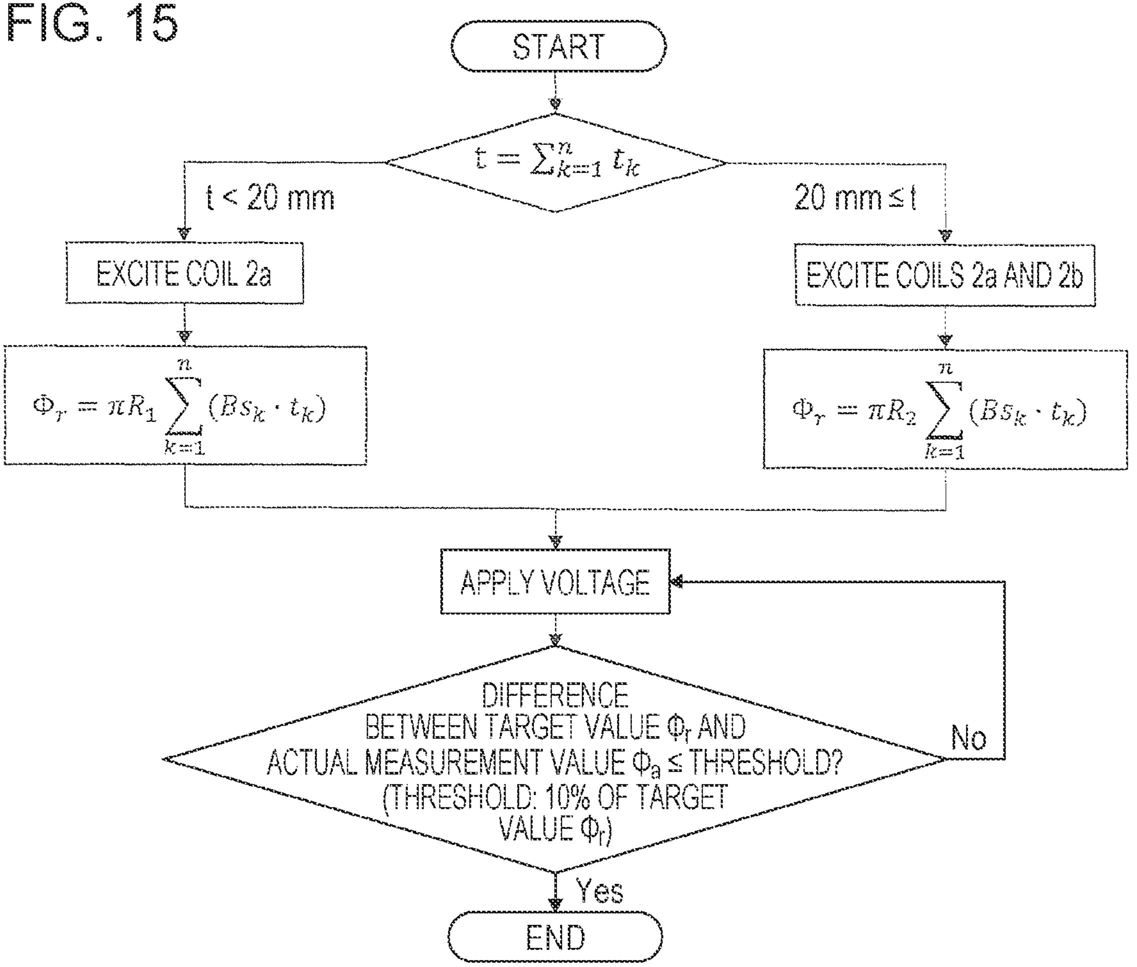
FIG. 15 is a steel plate lifting control flowchart according to the Example.

To evaluate the controllability of the number of steel plates to be lifted in the disclosed embodiments, the following test was performed. A lifting magnet as illustrated in FIG. 14 (including a magnetic flux sensor 4 (4*a* and 4*b*) similar to that in the embodiment illustrated in FIGS. 1 and 2) having a height of 160 mm and including concentric first and second coils 2*a* and 2*b*, an inner pole 3*x* having an outer diameter of 100 mm, a first outer pole 3*a* having an outer diameter of 180 mm and a thickness of 20 mm, and a second outer pole 3*b* having an outer diameter of 350 mm and a thickness of 20 mm was used. Then, the control of the number of steel plates to be lifted was performed in accordance with a control flow illustrated in FIG. 15. The steel plates to be lifted were all SS400 plates (with a saturation magnetic flux density of 1.5 T) and had a thickness of 4.5 mm, and the number of steel plates to be lifted was set to 1 to 6.

In this Example, only the first coil 2*a* was used (excited) if the total thickness of the steel plates to be lifted was less than 20 mm, and the first coil 2*a* and the second coil 2*b* were used (excited) if the total thickness was not less than 20 mm. A threshold was set to 10% of the calculated amount of passing magnetic flux $\Phi_r$ in the magnetic pole (target value). Feedback control was performed so that the difference between the calculated amount of passing magnetic flux $\Phi_r$ in the magnetic pole 3 (target value) and the amount of passing magnetic flux $\Phi_a$ (actual measurement value), which was measured by the magnetic flux sensor, was equal to or less than the threshold, and the application voltage for the coil or coils 2 was adjusted.

The results of this Example are shown in Table 1. According to the results, the first coil 2*a* was excited when the number of steel plates to be lifted was 1 to 4. When the number of steel plates to be lifted was 5 or 6, the first and second coils 2*a* and 2*b* were excited. In this way, the application voltage is controlled based on the amount of passing magnetic flux $\Phi_a$ in the magnetic pole 3 (actual measurement value), which is measured by the magnetic flux sensor 4, with respect to the amount of passing magnetic flux $\Phi_r$ in the magnetic pole (target value), which is calculated in accordance with the outer diameter sizes of the inner pole 3*x* and the first outer pole 3*a*. As a result, the number of steel plates to be lifted can be controlled under the condition in which the number of steel plates to be lifted is any of 1 to 6.

TABLE 1

| No. | Number of steel plates to be lifted | Excitation coil | $R_i$ (mm) in formula (2) | Amount of passing magnetic flux $\Phi_r$ [target value] ($T \cdot mm^2$) | Application voltage (V) | Amount of passing magnetic flux $\Phi_a$ [actual measurement value] ($T \cdot mm^2$) | Evaluation of controllability of number of steel plates to be lifted |
|---|---|---|---|---|---|---|---|
| 1 | 1 | First coil 2a | 100 | 2121 | 14.2 | 2028 | ○ |
| 2 | 2 | First coil 2a | 100 | 4241 | 22.7 | 4605 | ○ |
| 3 | 3 | First coil 2a | 100 | 6362 | 31.8 | 6688 | ○ |
| 4 | 4 | First coil 2a | 100 | 8482 | 41.2 | 8657 | ○ |
| 5 | 5 | First coil 2a, Second coil 2b | 180 | 19085 | 27.5 | 19439 | ○ |
| 6 | 6 | First coil 2a, Second coil 2b | 180 | 22902 | 32.2 | 23297 | ○ |

Comparative Example

A similar test was conducted by using a lifting magnet (single-layer structure), as illustrated in FIG. 16, which is generally used in a steelworks. The lifting magnet has a height of 150 mm and includes the inner pole 101 having a diameter of 150 mm, and the outer pole 102 having an outer diameter of 350 mm and a thickness of 20 mm.

In this Comparative Example, the amount of passing magnetic flux $\Phi_r$ in the magnetic pole (target value) in a case where the magnetic flux flowing out of the magnetic pole (the inner pole 101) passed through only the steel plates to be lifted when the coil 100 was excited was calculated, and a voltage was applied to the coil 100 based on the amount of magnetic flux $\Phi_r$. At this time, the amount of passing magnetic flux $\Phi_a$ in the magnetic pole (actual measurement value) was measured by a magnetic flux sensor attached to a lower end of the outer circumference of the coil 100.

The results of this Comparative Example are shown in Table 2. The size of the magnetic pole of the lifting magnet used in this Comparative Example is larger than that of the inner pole 3*x* in the Example. Thus, under the condition in which the number of steel plates to be lifted is one, the amount of passing magnetic flux $\Phi_a$ in the magnetic pole (actual measurement value), which is measured by the magnetic flux sensor, greatly exceeds the amount of passing magnetic flux $\Phi_r$ (target value) even if the application voltage is equal to or less than 10 V, and the number of steel plates to be lifted is not controllable.

TABLE 2

| No. | Number of steel plates to be lifted | $R_i$ (mm) in formula (2) | Amount of passing magnetic flux $\Phi_r$ [target value] ($T \cdot mm^2$) | Application voltage (V) | Amount of passing magnetic flux $\Phi_a$ [actual measurement value] ($T \cdot mm^2$) | Evaluation of controllability of number of steel plates to be lifted |
|---|---|---|---|---|---|---|
| 1 | 1 | 150 | 3181 | 8.9 | 4053 | x |
| 2 | 2 | 150 | 6362 | 14.1 | 5813 | ○ |
| 3 | 3 | 150 | 9543 | 20.5 | 8905 | ○ |
| 4 | 4 | 150 | 12723 | 27.8 | 12670 | ○ |
| 5 | 5 | 150 | 15904 | 36.5 | 15792 | ○ |
| 6 | 6 | 150 | 19085 | 43.3 | 18678 | ○ |

The invention claimed is:

1. A steel plate lifting method for using a lifting magnet configured to lift at least one steel plate to be lifted from among a plurality of stacked steel plates, the lifting magnet including a plurality of electromagnet coils that are each independently ON/OFF controllable and voltage-controllable, a magnetic pole that is excited by application of a voltage to the electromagnet coils, a control device that controls to lift the at least one steel plate, a magnetic flux sensor that measures an amount of passing magnetic flux pa in the magnetic pole, and a weight measurement means that measures the weight of the at least one steel plate that is lifted, and the steel plate lifting method comprising:

determining, based on a total thickness of the at least one steel plate to be lifted, an electromagnet coil to be used for lifting the at least one steel plate;

calculating an amount of passing magnetic flux Φr in the magnetic pole in a case where magnetic flux flowing out of the magnetic pole passes through only the at least one steel plate to be lifted when the electromagnet coil is used;

determining an application voltage to be applied to the electromagnet coil used for lifting the at least one steel plate, based on the amount of passing magnetic flux Φr;

applying the application voltage to the electromagnet coil to lift only the at least one steel plate to be lifted from among the plurality of stacked steel plates; and checking, by the control device, whether or not the number of the at least one steel plate lifted matches the number of the at least one steel plate determined to be lifted in advance by determining whether or not a difference between the calculated amount of passing magnetic flux Φr in the magnetic pole and the measured amount of passing magnetic flux Φa in the magnetic pole is equal to or less than a threshold after applying the application voltage to the electromagnet coil and starting lifting of the at least one steel plate with the lifting magnet before moving the lifting magnet with which the at least one steel plate is lifted, the amount of passing magnetic flux Φr in the magnetic pole being calculated by the control device, and the amount of passing magnetic flux Φa in the magnetic pole being measured by the magnetic flux sensor, wherein when the difference is equal to or less than the threshold and the number of the at least one steel plate lifted matches the number of the at least one steel plate determined to be lifted in advance, the control device further checks whether or not the number of the at least one steel plate lifted matches the number of the at least one steel plate determined to be lifted in advance, based on the weight of the at least one steel plate measured by the weight measurement means.

2. The steel plate lifting method for using a lifting magnet according to claim 1, wherein the steel plate lifting method further comprises, when applying the application voltage to the electromagnet coil, adjusting the application voltage for the electromagnet coil such that the difference between the calculated amount of passing magnetic flux $\Phi_r$ in the magnetic pole and the measured amount of passing magnetic flux $\Phi_a$ in the magnetic pole is equal to or less than the threshold.

3. The steel plate lifting method for using a lifting magnet according to claim 1, wherein the amount of passing magnetic flux $\Phi_r$ in the magnetic pole is calculated based on a thickness and a saturation magnetic flux density of each steel plate to be lifted and a size of the magnetic pole excited by application of the application voltage to the electromagnet coil.

4. The steel plate lifting method for using a lifting magnet according to claim 1, further comprising: after starting lifting of the at least one steel plate with the lifting magnet, performing, before moving the lifting magnet with which the at least one steel plate is lifted, at least one of:

(I) increasing the application voltage for the electromagnet coil being used for lifting the at least one steel plate, and (II) applying a voltage to one or more other electromagnet coils in addition to the electromagnet coil being used for lifting the at least one steel plate.

5. The steel plate lifting method for using a lifting magnet according to claim 1, wherein the plurality of electromagnet coils include a plurality of electromagnet coils that are arranged at least one of concentrically and vertically in layers.

6. A lifting magnet comprising:

a plurality of electromagnet coils that are each independently ON/OFF-controllable and voltage-controllable;

a magnetic pole that is excited by application of a voltage to the electromagnet coils;

a controller configured to execute the steps of:

determining, when at least one steel plate to be lifted is to be lifted from among a plurality of stacked steel plates, an electromagnet coil to be used for lifting the at least one steel plate, based on a total thickness of the at least one steel plate to be lifted, calculating an amount of passing magnetic flux Φr in the magnetic pole in a case where magnetic flux flowing out of the magnetic pole passes through only the at least one steel plate to be lifted when the electromagnet coil is used, determining an application voltage to be applied to the electromagnet coil used for lifting the at least one steel plate, based on the amount of passing magnetic flux Φr, and applying the application voltage to the electromagnet coil;

a magnetic flux sensor that measures an amount of passing magnetic flux Φa in the magnetic pole; and a weight measurement means that measures a weight of at least one steel plate lifted, wherein the controller checks whether or not the number of the at least one steel plate lifted matches the number of the at least one steel plate determined to be lifted in advance by determining whether or not a difference between the calculated amount of passing magnetic flux Φr in the magnetic pole and the measured amount of passing magnetic flux Φa in the magnetic pole is equal to or less than a threshold after applying the application voltage to the electromagnet coil and starting lifting of the at least one steel plate before moving the at least one steel plate that is lifted, the amount of passing magnetic flux $\Phi_r$ in the magnetic pole being calculated by the controller, and the amount of passing magnetic flux $\Phi_a$ in the magnetic pole being measured by the magnetic flux sensor, wherein when the difference is equal to or less than the threshold and the number of the at least one steel plate lifted matches the number of the at least one steel plate determined to be lifted in advance, the controller further checks whether or not the number of the at least one steel plate lifted matches the number of the at least one steel plate determined to be lifted in advance, based on the weight of the at least one steel plate measured by the weight measurement means.

7. The lifting magnet according to claim 6, further comprising wherein the controller is further configured to, when applying the application voltage to the electromagnet coil, execute the step of adjusting the application voltage for the electromagnet coil such that the difference between the calculated amount of passing magnetic flux $\Phi_r$ in the magnetic pole and the measured amount of passing magnetic flux $\Phi_a$ in the magnetic pole is equal to or less than a threshold.

8. The lifting magnet according to claim 6, wherein the controller is further configured to execute the step of calculating the amount of passing magnetic flux Φr in the magnetic pole, based on a thickness and a saturation magnetic flux density of each steel plate to be lifted and a size of the magnetic pole excited by application of the application voltage to the electromagnet coil to be used.

9. The lifting magnet according to claim 6, wherein the plurality of electromagnet coils include a plurality of electromagnet coils that are arranged at least one of concentrically and vertically in layers.

10. A method for manufacturing a steel plate by using the lifting magnet according to claim 6 to form a steel plate.

* * * * *